INVENTOR.
HAROLD OSTERBERG
GILBERT E. PRIDE
BY HELEN JUPNIK
Herbert C. Kimball
ATTORNEY April 24, 1951 G. E. PRIDE ET AL 2,549,926
APPARATUS FOR MAKING OPTICAL DEVICES
Filed May 2, 1947 3 Sheets-Sheet 3
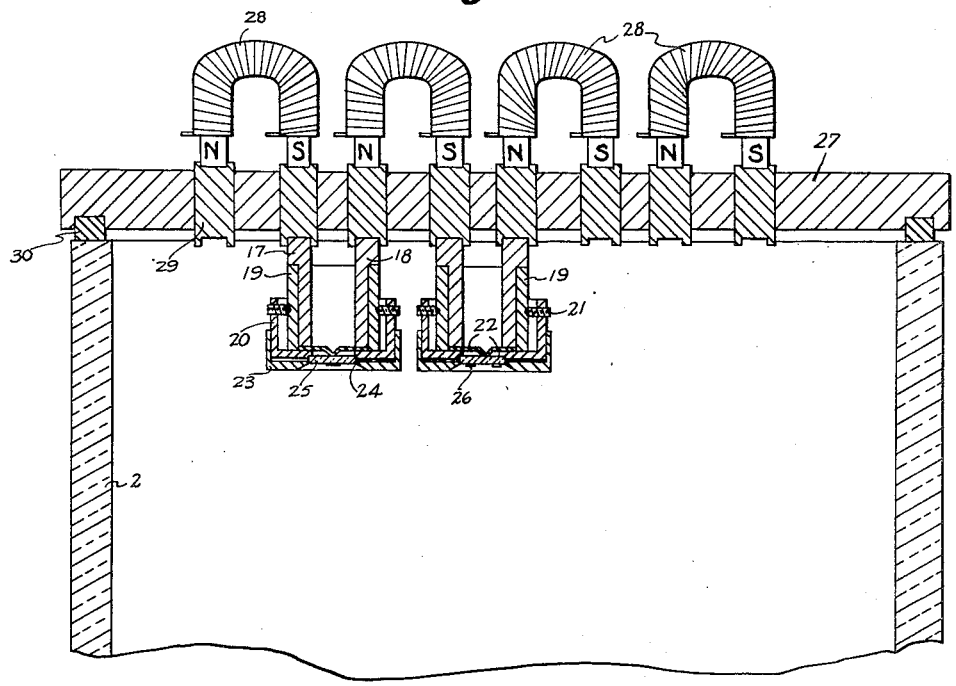
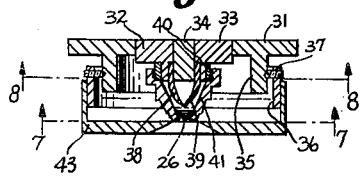
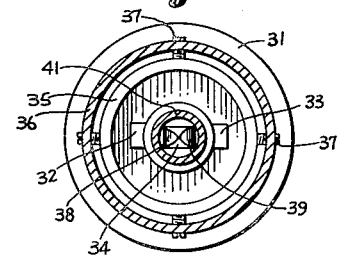
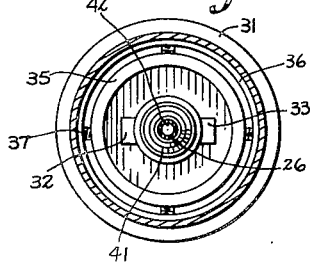
INVENTOR.
HAROLD OSTERBERG
GILBERT E. PRIDE
BY HELEN JUPNIK
Herbert C. Kimball
ATTORNEY Patented Apr. 24, 1951

2,549,926

UNITED STATES PATENT OFFICE 2,549,926

APPARATUS FOR MAKING OPTICAL DEVICES

Gilbert E. Pride, Harold Osterberg, and Helen Jupnik, Buffalo, N. Y., assignors to American Optical Company, Southbridge, Mass., a voluntary association of Massachusetts Application May 2, 1947, Serial No. 745,602

3 Claims. (Cl. 91—12.2)

This invention relates to new and improved apparatus and process for making coatings of desired pattern or outline on the surface of an article. The application is a continuation in part of application Serial No. 531,932 filed April 20, 1944 and which issued March 8, 1949 as Patent No. 2,463,906.

An object of the invention is to provide new and improved process and apparatus of the vacuum distillation type for forming a deposit where it is essential that the location and configuration of the deposit be exactly controlled. For instance in the formation of light modifying means of the type set forth in the application of Osterberg et al. filed August 28, 1942, Serial No. 456,726, and issued September 23, 1947, as Patent No. 2,427,689, such exactitude of control is requisite and it is an object of the invention to provide a method and apparatus for enabling such control in the production of this type of optical device.

A further object is to provide a method and apparatus for coating optical or other surfaces whereby a shield forms a pattern corresponding to the shield with the coating extending uniformly to the line of demarkation of the pattern, thereby insuring a sharp line of demarkation and a faithful reproduction of the pattern of the shield.

Referring to the drawings:

Fig. 5 is a fragmentary view similar to Fig. 1 but showing a further form of the invention;

Fig. 6 is a sectional view of another form of the support;

Fig. 7 is a sectional view taken on line 7—7 of Fig. 6 looking in the direction of the arrows; and Fig. 8 is a sectional view taken on line 8—8 of Fig. 6 looking in the direction of the arrows.

Figure 1:
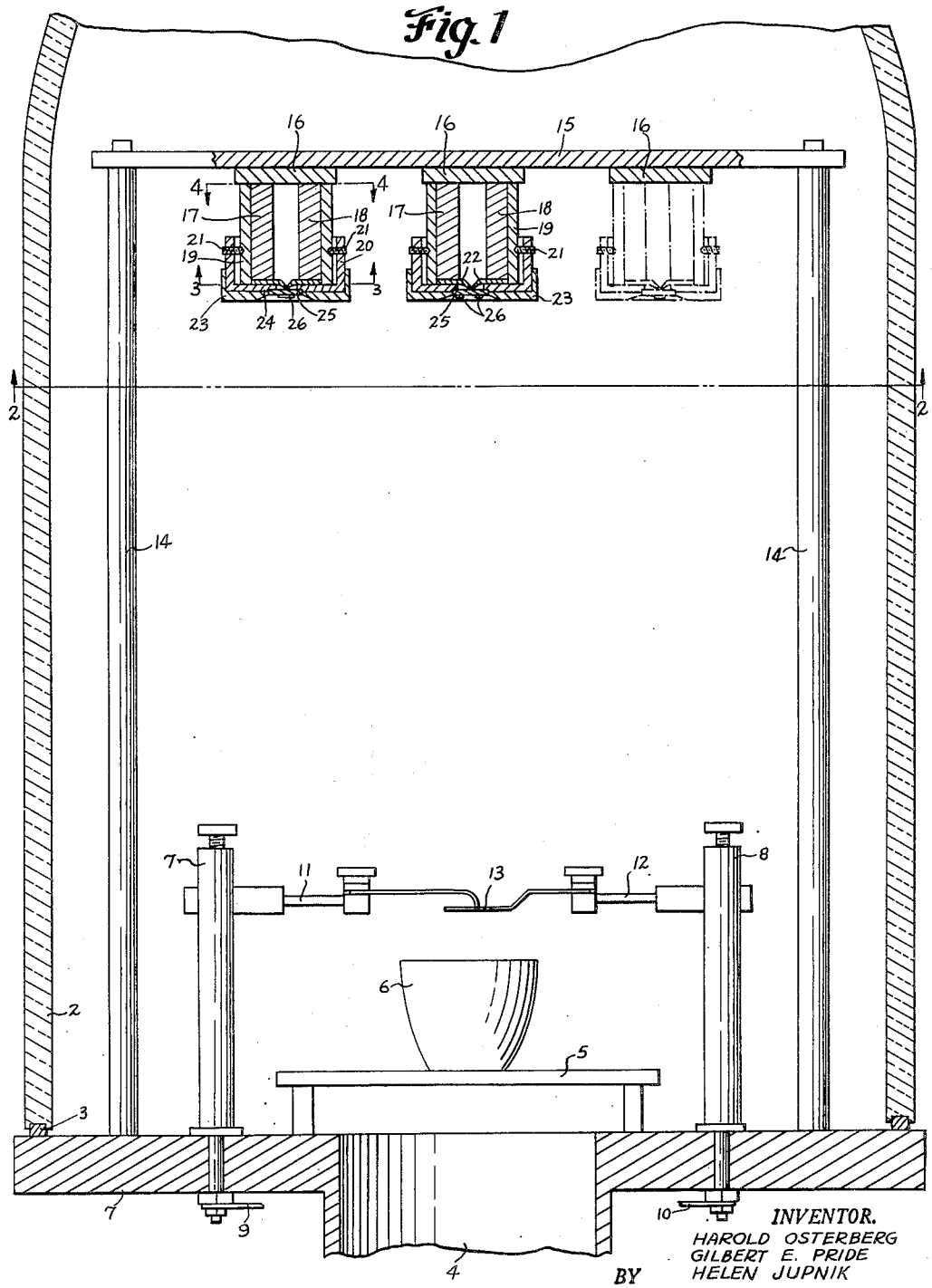
Fig. 1 is a sectional view of an apparatus embodying the invention.
Figure 2:
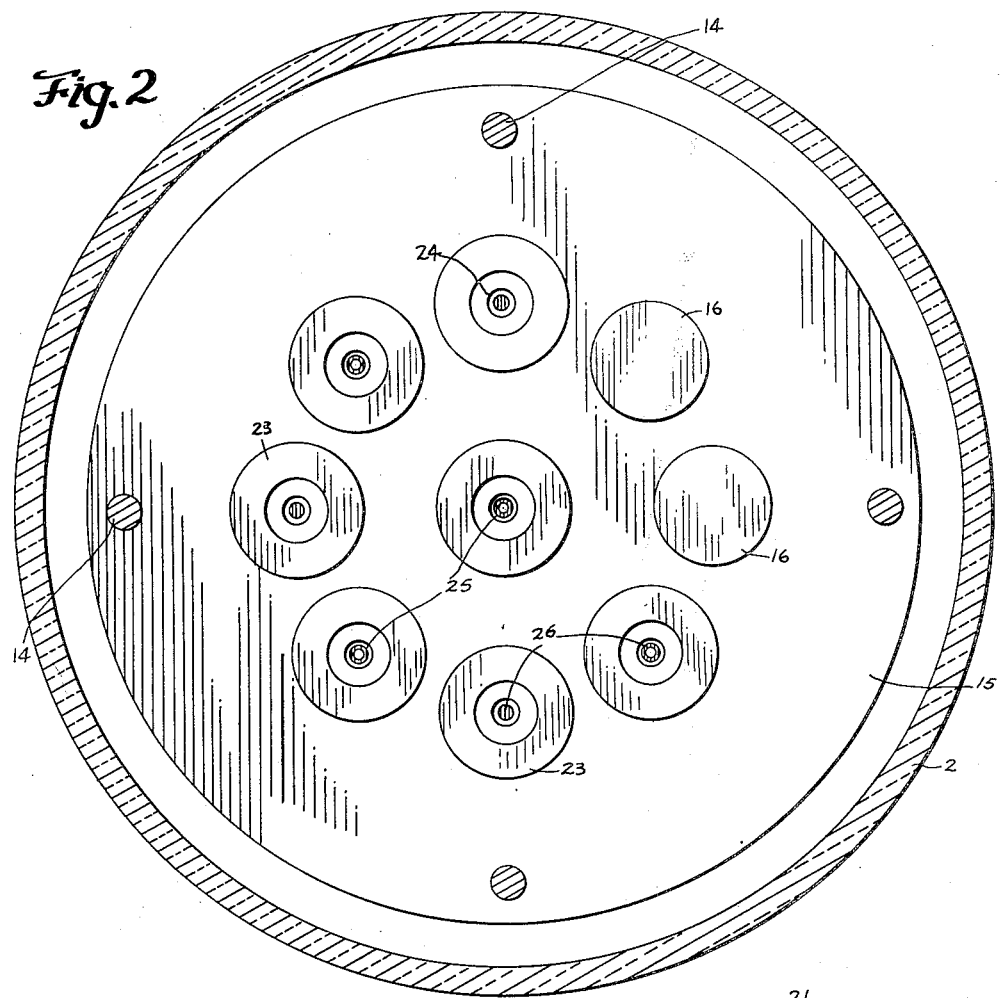
Fig. 2 is a sectional view taken on line 2—2 of Fig. 1 looking in the direction of the arrows.
Figure 3:
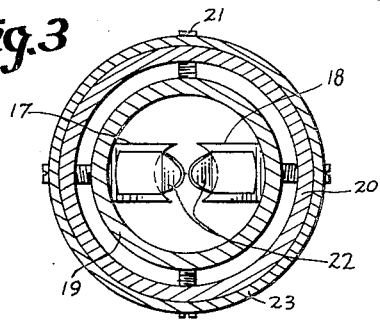
Fig. 3 is a sectional view taken on line 3—3 of Fig. 1 looking in the direction of the arrows.
Figure 4:
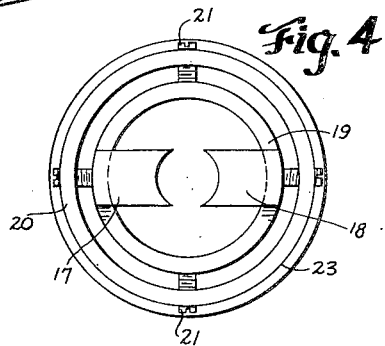
Fig. 4 is a sectional view taken on line 4—4 of Fig. 1 looking in the direction of the arrows.

The vacuum apparatus shown in Figs. 1 and 2 comprises a base 1 on which is positioned the bell jar or the like 2 to form the vacuum chamber.

Between the lower edge of the bell jar 2 and the surface of the base 1 is positioned the rubber gasket or sealing member 3.

The base 1 is provided with the opening 4 which is connected to a vacuum pump for evacuating the vacuum chamber and over this opening 4 is positioned the support 5 for supporting the crucible 6 which is adapted to contain the coating material to be evaporated.

The electrodes 7 and 8 are provided and have extensions extending through the base 1 and adapted to receive current from the leads 9 and 10 respectively.

The electrodes 7 and 8 are provided with the connecting portions 11 and 12 respectively connected to the opposite ends of a heat source such as the heating coil indicated by the numeral 13. Such a heat source when supplied with electric current through the electrodes 7 and 8 radiates heat upon the coating material contained in the crucible 6, and thereby causes evaporation of that material so as to disperse it through the space under the bell jar 2.

On the base 1 and within the vacuum chamber member 2 are provided the uprights 14 which may be of any desired number but of which four are shown in the form of the apparatus shown in Figs. 1 and 2.

Supported on the upper end of the supports 14 is the platform 15. For convenience in locating the magnets (later to be described), this platform 15 may be provided on its under side with pads or spacer members 16, although these members 16 may be omitted if desired.

The members 16 may be formed integral with the platform 15 or secured thereto by welding, soldering or other suitable processes. The members 16 and the platform 15 may be of magnetic material or non-magnetic as desired.

Extending from the spacer members 16 on the platform 15 are the permanent magnet members 17 and 18, one pair being provided for each member 16. These magnet members 17 and 18 may be secured to the platform 15 (or the spacer member 16 as the case may be) by welding, soldering or the like. If the member 15 or 16 is of magnetic material, the permanent magnets 17 and 18 may be retained in contact therewith by means of the magnetic force exerted by said members 17 and 18.

Surrounding the magnet members 17 and 18 is a support member 19 in the form of a hollow cylinder of non-magnetic material such as brass, aluminum, copper, etc. The outer surfaces of the members 17 and 18 are preferably secured to the cylinder 19. A centering cap which is also of non-magnetic material surrounds one end of the cylinder 19 and is adjustable into accurately centered position by the set screws 21. The centering screws 21 engage in a shallow depression circling the cylinder 19 and when tightened hold the cap 20 in position. The centering cap 20 has a central opening adapted to be placed in alignment with the space between the magnet members 17 and 18. Between the cap 20 and the end faces of the magnets 17 and 18 are provided the adjustable magnet tips 22 of soft iron or the like. The spacing of the caps as they are magnetically held on the magnets is first determined. Then with the article seated in the cap 20, the latter is put in place on the end of cylinder 19 and accurately centered with respect to the two tips 22 by means of the set screws 21. The tips may be thus centered while being held merely by magnetic flux or they may be secured in some mechanical device having centering screws for adjustment of these said adjustable magnet tips. It is important that the tips 22 be accurately positioned relative to the seat in cap 20 because it has been found that the shield members (later to be described) are accurately centered on the article when and only when the positioning of the tips 22 is correct. Assuming the latter, the shield members may be manually placed in approximately centered position, and the jarring of the apparatus in use will cause the shield members to creep into exactly centered position.

Over the end of the centering cap 20 is positioned a spring retaining cap 23 which is likewise of non-magnetic material and is adapted to be retained over the end of the centering cap 20 by friction.

The retaining cap 23 has a central opening with a peripheral flange 24 adapted to support the object, the surface of which is to be coated, between said flange 24 and the surface of the centering cap 20 which may be countersunk to form a recess or seat for the article to be coated if desired.

Over that portion of the surface of the article to be coated 25, on which it is desired not to place a coating there is positioned a thin shield member 26 of a magnetic material.

By proper adjustment of the adjustable magnetic tips 22, upon placing the magnetic shield member 26 on the surface of the article to be coated 25, the magnetic force exerted by said adjustable magnetic tips 22 will automatically cause said shield 26 to be properly positioned over that portion of the surface of the article which is to be shielded during the coating operation and remain uncoated when the coil 13 is energized and the material in the crucible 6 is vaporized and dispersed through the bell jar to form a coating on surfaces exposed thereto.

The shield member 26 may be of any desired configuration for example a sectional element or a ring shaped element as shown in the drawings depending upon the contour or configuration of the portion of the surface of the member 25 which it is desired to have remain uncoated.

The light modifying means described in the Osterberg et al. application above referred to are used as a part of an optical system and more particularly in a high power microscope for obtaining greater contrast in the appearance of the material observed by the microscopist. This use entails accuracy in the light modifying means to a degree which requires great fidelity in reproducing the outline of a shield member 26. Accordingly, a shield member 26 which is ring-shaped must be completely isolated since the shadow of a support extending laterally from the ring-shaped shield member 26 would have its effect in the coating of the article 25. The use of magnetic force in maintaining the shield member 26 in position beneath the exposed surface of the article 25 has particular utility in the accurate coating of a light modifying element whose use entails the high degree of accuracy required for the parts of a microscope. By clamping the shield member 26 in position magnetically, the uncoated portion of the surface of the article 25 remains completely isolated and at the same time the shield member 26 is securely maintained in accurate position without marring the surface of the article to be coated 25.

In the apparatus shown in Fig. 5 the platform 27 is of non-magnetic material and the magnetic force for the members 17 and 18 is provided by the electromagnets 28. If desired permanent magnets may be used in place of the electromagnets 28.

Extending through the platform 27 are the extensions or pole pieces 29, a north pole and a south pole constituting a pair of corresponding to the pair referred to in connection with the permanent magnets used in the embodiment of the invention illustrated in Fig. 1. In this embodiment a cylinder 19 is employed as before, together with its centering cap 20, the centering screws 21, the adjustable magnet tips 22, and the spring retaining cap 23. The flange 24 of the latter again bears against the lower rim of the article 25 to be coated.

In this embodiment the platform 27 also forms the top cover of the evacuated chamber and the sealing medium or gasket 30 is provided between the lower surface of the platform 27 and the edge of the chamber member 2 to seal this connection.

In Figs. 6, 7 and 8 is shown a slightly modified form of the invention which form is adapted for use in the coating of surfaces of articles which are mounted in cells and cannot conveniently be removed therefrom for the coating operation.

In this form, the permanent magnets 32 and 33 are carried by a support member 31 and are separated by a central spacing member 34, the members 31 and 34 being of non-magnetic material such as brass.

The member 31 has the depending flange 35 on which is centered the centering member 36 by means of the centering screws 37. A spring cap or shield 43 having central openings in alignment with the object to be coated slips over the lower end of the member 36 with a friction fit.

Between the central spacing member 34 and the ends of the magnet members 32 and 33 are positioned the adjustable manget tips 38 and 39 of soft iron, soft steel or the like.

A threaded connection 40 is provided to which is connected the threaded portion of the cell or the like 41 in which is mounted the member 42 to be coated.

The shield member 26 is provided in the manner described with the previous forms.

The cell 41 is generally of non-magnetic material, but in case it should not be, at least the threaded connection 40 is of non-magnetic material.

In coating the surface of articles 25 with the present apparatus one of the articles 25 is placed in each of the holders with the shield member 26 in proper position thereon as previously described, due to the passage of magnetic flux through the article to the shield member. When current is applied to heat the coil 13, the coating material is evaporated in the crucible 6 to cause a deposit to be formed on the exposed surface of the article 25. A coating is thereby formed of the desired pattern on said surface, namely the portion of the surface which is not covered by the shield 26.

It is pointed out that the present apparatus is designed primarily for production use and that while a number of holders are shown that the number thereof may be increased depending upon the size of the apparatus employed and the size of the holders necessary for the discs.

It is also pointed out that the opening in the cover 23 and centering cap 20 may be formed of such size as is necessary to accommodate the particular members 25 to be coated.

Having illustrated and described certain preferred embodiments of our invention, what we desire to claim and secure by Letters Patent is:

1. In a coating device of the vacuum distillation type having means within a hermetic enclosure for vaporizing a coating material, apparatus within said enclosure for exposing an article to the vaporized coating material for coating a portion of the surface thereof, said apparatus comprising a relatively fixed supporting part and a relatively movable article supporting part carried thereby, adjustable screw means associated therewith for moving said movable part and accurately centering the article to be coated, a magnetic shield of relatively small size for masking a portion of the exposed surface of the article so that said portion will remain uncoated, magnetic means disposed in normally fixed relation to said fixed part, a pair of magnetic members carried by said magnetic means and having pointed tip portions adapted to be positioned in closely adjacent relation to each other adjacent the opposite surface of said article for clamping said magnetic shield to the article by magnetic flux exerted therethrough, said magnetic members being adjustable relative to said magnetic means for determining the approximate location at which the tip portions thereof will exert said magnetic flux, and said adjustable screw means being adapted to move said article into an exact predetermined position relative thereto.

2. In a coating device of the vacuum distilling type having means with a hermetic enclosure for vaporizing the coating material, apparatus within said enclosure for exposing an article to the vaporized coating material for the coating of a portion of a surface thereof, said apparatus comprising a relatively fixed member and an article supporting and positioning member movably carried thereby, means associated with said movable member for centering the article to be coated, a relatively small mask for masking the exact predetermined portion of said surface which is to remain uncoated, and magnetic means including a pair of individually adjusted pointed tips at the side of the article opposite said mask for clamping and centering said mask in the exact position desired on the surface which is to be coated.

3. In a coating device of the vacuum type having means for vaporizing coating material, the combination of a support for positioning an article so as to expose the surface thereof which is to be coated, and a magnetic shield for masking an exact predetermined portion of said article, said support including a magnet having a pair of closely positioned pointed force concentrating tips adjacent the opposite surface of the article, and manually adjustable centering screw means for centering the article relative to the magnet and tips with the magnetic shield clamped to the article by the force exerted by said magnet through said tips.

GILBERT E. PRIDE.
HAROLD OSTERBERG.
HELEN JUPNIK.

REFERENCES CITED

The following references are of record in the file of this patent:

UNITED STATES PATENTS

| Number | Name | Date |
|---|---|---|
| 2,338,234 | Dimmick | Jan. 4, 1944 |
| 2,410,720 | Dimmick | Nov. 5, 1946 |
| 2,463,906 | Pride | Mar. 8, 1949 |